UNITED STATES PATENT OFFICE.

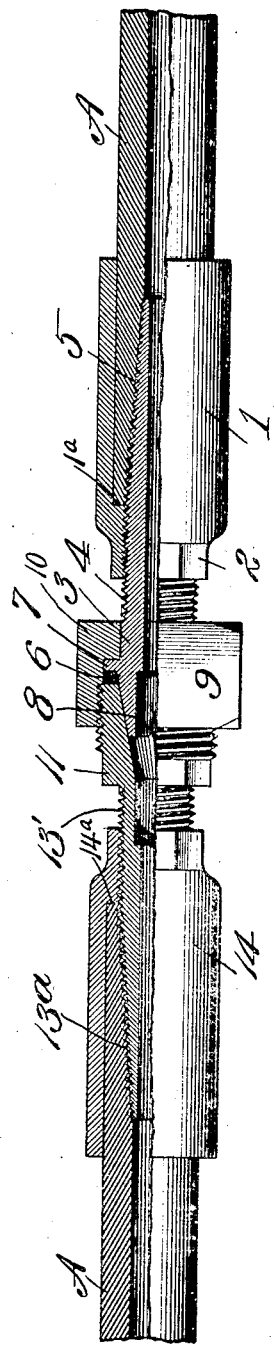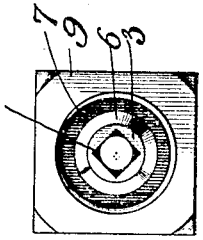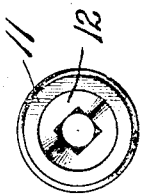

JOHN G. MASSIE, OF BELLEVILLE, ILLINOIS.

HOSE-COUPLING.

No. 872,001.   Specification of Letters Patent.   Patented Nov. 26, 1907.

Application filed January 14, 1907. Serial No. 352,199.

*To all whom it may concern:*

Be it known that I, JOHN G. MASSIE, a citizen of the United States of America, residing in Belleville, in the county of St. Clair and State of Illinois, have invented certain new and useful Improvements in Hose-Couplings, of which the following is a full, clear, and exact description, reference being had to the accompanying drawings, forming part of this specification.

My invention relates to a hose coupling more particularly intended for use in connection with hose through which fluids are conducted under a high pressure and is especially valuable for the connection of sections of hose through which compressed air is conducted to machines that are operated by compressed air. The coupling is, however, adapted to be used in connection with hose through which water or any other fluid is conducted.

Figure I is a view partly in elevation and partly in longitudinal section of the coupling shown uniting two sections of hose. Fig. II is an end elevation of the female member of the coupling. Fig. III is an end elevation of the male member of the coupling and the binding nut that connects the male and female members.

A designates sections of rubber hose of uniform thickness.

1 designates a sleeve having an interior shoulder 1ª and a plain unobstructed interior surface into which the end of the section of hose is introduced and against the shoulder of which the end of the hose is seated and which is provided at its forward end with an interiorly screw-threaded neck 2.

3 is the male member of the coupling which comprises a long cylindrical screw-threaded shank 4 that is adapted to be screwed into the neck of the sleeve 1 and terminates in long tapered portion 5 that is also screw-threaded and is adapted to enter into the section of hose that is seated in the sleeve 1. The male member of the coupling also comprises a conical part 6 located at its forward end and at the base of which is an annular rim 7. The male member is provided with a channel extending longitudinally therethrough which is preferably of uniform diameter from end to end of the member except at its forward end, at which point the channel is made non-circular as seen at 8, Figs. I and III in order that a suitable implement may be introduced into this end for the purpose of turning the member in the sleeve 1 after it is placed in screw-threaded engagement therewith. When the male member is turned in said sleeve while the section of hose is present in the sleeve, the tapered screw-threaded rear end of the shank of said member impinges against the interior wall of the section of hose with the result of forcing the interior wall of the hose outwardly so as to press its exterior wall outwardly into close or binding contact with the wall of the sleeve surrounding it, this condensing the hose and firmly binding it between the impinging members. The tapering end of the male member shank being threaded, its threads enter into the texture or substance of the hose and act with locking action thereupon in addition to the binding action exerted by the shank and the sleeve surrounding the hose.

9 designates a nut which surrounds the male member of the coupling and is provided with an internal flange 10 that bears against the annular rim 7 of the male member. The forward end of this nut which surrounds the conical part of the male member is threaded interiorly.

11 designates the female member of the coupling which is threaded externally and is adapted to be engaged by the nut 9. This female member is provided with a channel which is in part conical, and is complementary to the conical part 6 of the male member of the coupling that enters into said conical part of the channel in the female member. It will be seen that when the nut 9, if placed in threaded engagement with the female member of the coupling after it is fitted to the conical part of the male member and said nut is turned in the proper direction, the male and female members of the coupling will be drawn together in a manner to effect a tight joint between them. The female member 11 of the coupling is provided with a screw-threaded shank 13' similar to the shank of the male member of the coupling and terminating in a screw-threaded conical portion 13ª which is surrounded by a sleeve 14 having an interior shoulder 14ª, a screw-threaded neck fitted to said shank and in which a section A of hose is introduced to be bound or clamped therein in a manner similar to that in which the section of hose associated with the male member of the coupling is bound or clamped.

I claim:

A hose coupling comprising a sleeve formed with a plain unobstructed interior surface, with an interior shoulder at its inner end, and with a neck having a cylindrical interiorly screw-threaded throat, a connection member formed, at one end, with a long cylindrical exteriorly screw-threaded channeled shank, fitted to said throat, and with a long tapering exteriorly screw-threaded portion extending from the channeled shank and at its other end with an annular rim and with a conical part, a second connection member formed, at one end, with an external screw-thread and a conical channel fitted to the conical part, and, at its other end, with a long cylindrical exteriorly screw-threaded channeled shank, and with a long tapering exteriorly screw-threaded portion extending from the channeled shank, a second sleeve formed with a plain unobstructed interior surface, with an interior shoulder at its inner end, and with a neck having a cylindrical interiorly screw-threaded throat fitted to said channeled shank of the second connection member, and a coupling nut formed with an internal flange and an interior screw thread fitted to the external screw-thread of the second connection member.

JOHN G. MASSIE.

In presence of—
 FRED H. KRUGER,
 F. F. KISSEL.